(12) United States Patent
Stadtmueller et al.

(10) Patent No.: US 11,553,987 B2
(45) Date of Patent: Jan. 17, 2023

(54) METHOD OF OPTIMIZING MANUFACTURE OF A THREE-DIMENSIONAL ARTICLE HAVING AN INTERFACE SURFACE

(71) Applicant: 3D Systems, Inc., Rock Hill, SC (US)

(72) Inventors: Madison Stadtmueller, Encinitas, CA (US); James Pingle, San Diego, CA (US)

(73) Assignee: 3D SYSTEMS, INC., Rock Hill, SC (US)

( * ) Notice: Subject to any disclaimer, the term of this patent is extended or adjusted under 35 U.S.C. 154(b) by 95 days.

(21) Appl. No.: 17/001,098

(22) Filed: Aug. 24, 2020

(65) Prior Publication Data

US 2021/0052353 A1    Feb. 25, 2021

Related U.S. Application Data

(60) Provisional application No. 62/890,655, filed on Aug. 23, 2019.

(51) Int. Cl.
| | |
|---|---|
| *A61C 5/77* | (2017.01) |
| *B29C 64/393* | (2017.01) |
| *B33Y 50/02* | (2015.01) |
| *B29C 64/135* | (2017.01) |
| *B33Y 80/00* | (2015.01) |
| *B33Y 10/00* | (2015.01) |
| *B33Y 30/00* | (2015.01) |

(52) U.S. Cl.
CPC .............. *A61C 5/77* (2017.02); *B29C 64/135* (2017.08); *B29C 64/393* (2017.08); *B33Y 10/00* (2014.12); *B33Y 30/00* (2014.12); *B33Y 50/02* (2014.12); *B33Y 80/00* (2014.12)

(58) Field of Classification Search
CPC .......... A61C 5/77; B33Y 10/00; B33Y 30/00; B33Y 50/02; B33Y 80/00; B29C 64/393; B29C 64/01
See application file for complete search history.

(56) References Cited

U.S. PATENT DOCUMENTS

| | | | |
|---|---|---|---|
| 5,870,307 A | 2/1999 | Hull et al. | |
| 6,207,097 B1 | 3/2001 | Iverson | |
| 6,375,874 B1 | 4/2002 | Russell et al. | |
| 7,589,868 B2 | 9/2009 | Velde et al. | |
| 9,403,322 B2 | 8/2016 | Das et al. | |
| 9,643,362 B2 | 5/2017 | Amadio et al. | |

(Continued)

FOREIGN PATENT DOCUMENTS

| | | |
|---|---|---|
| WO | 2016050300 A1 | 4/2016 |
| WO | 2018022032 A1 | 12/2018 |

*Primary Examiner* — Joseph S Del Sole
*Assistant Examiner* — John Robitaille (57) ABSTRACT

A system for manufacturing a three-dimensional article includes a controller configured to: receive an input file defining a geometry of the three-dimensional article; receive information specifying an interface surface of the article over which the article will fit against a three-dimensional body; slice the geometry; identify intersecting slices that intersect the interface surface; and for the intersecting slices, alter a halftone range along the interface surface. Along the interface surface, the article slidingly engages the three-dimensional body. The sliding engagement can be sufficient to provide a fluid seal along the interface surface.

18 Claims, 6 Drawing Sheets

(56) References Cited

U.S. PATENT DOCUMENTS

| | | |
|---|---|---|
| 9,841,750 B2 | 12/2017 | Willies et al. |
| 10,326,910 B2 | 6/2019 | Morovic et al. |
| 10,338,566 B2 | 7/2019 | Zucheul et al. |
| 10,488,846 B2 | 11/2019 | Donovan et al. |
| 10,538,074 B2 | 1/2020 | Cortes et al. |
| 2009/0042167 A1* | 2/2009 | Van Der Zel ........ A61C 9/0053 433/172 |
| 2016/0176117 A1* | 6/2016 | Lee .................... G05B 19/4099 700/98 |
| 2018/0015662 A1 | 1/2018 | Ermoshkin et al. |
| 2018/0134028 A1* | 5/2018 | Morovic ................. G06T 17/20 |

* cited by examiner

FIG. 8

METHOD OF OPTIMIZING MANUFACTURE OF A THREE-DIMENSIONAL ARTICLE HAVING AN INTERFACE SURFACE

CROSS-REFERENCE TO RELATED APPLICATIONS

This non-provisional patent application claims priority to U.S. Provisional Application Ser. No. 62/890,655, Entitled "A METHOD OF OPTIMIZING MANUFACTURE OF A THREE-DIMENSIONAL ARTICLE HAVING AN INTERFACE SURFACE" by Madison Stadtmueller et al., filed on Aug. 23, 2019, incorporated herein by reference under the benefit of U.S.C. 119(e).

FIELD OF THE INVENTION

The present disclosure generally concerns an apparatus and method for the digital fabrication of three dimensional articles of manufacture. More particularly, the present disclosure concerns a way of fabricating a three-dimensional article having a precision interface surface that must fit over another body.

BACKGROUND

Three-dimensional manufacturing systems are in widespread use. Examples of three dimensional printer technologies includes stereolithography, selective laser sintering, and fused deposition modeling to name a few. Some of these technologies utilize sophisticated imaging techniques to most accurately replicate a desired geometry. One particular challenge arises when a surface of an article must sealingly interface with another body.

SUMMARY

In a first aspect of the disclosure, a system for manufacturing a three-dimensional (3D) article includes a controller configured to: receive an input file defining a geometry of the three-dimensional article; receive information specifying an interface surface of the article over which the article will fit against a three-dimensional body; slice the geometry; identify intersecting slices that intersect the interface surface; and for the intersecting slices, alter a halftone range along the interface surface. Along the interface surface, the article slidingly engages the three-dimensional body. The sliding engagement can be sufficient to provide a fluid seal along the interface surface. The altered halftone along the interface zone optimizes a portion of the 3D article along the interface zone. In particular, the portion along the interface zone can be strengthened, and the interface zone can be better defined. This is important, because the interface zone is where the 3D article and the body are to be fit together. The fit defines a joint upon which there is stress and needs to be sealed against fluids.

In one implementation, the three-dimensional article is a dental crown. The dental crown has a concave surface defining a cavity for receiving a tooth. The interface surface is an outer margin of the concave surface which is along an entrance to the cavity. This is particularly important for the outer margin. The outer margin is strengthened and the interface surface for fitting against the tooth is better defined.

In another implementation, the geometry defines a main surface and the interface surface. The main surface accounts for over 90% of a surface area of the geometry. The main surface is defined by N gray levels. The interface surface is defined by M gray levels and M<N. For example, N can be a grayscale from 0 to 255 (256 levels). M can be a grayscale from 200-255 (56 gray levels). A lower portion of the gray levels is "clipped off". Stated another way, all pixels below 200 are set to 200. The result is a more consistent polymerization of material in the interface or margin region which results in a more consistent surface and a stronger portion of the 3D article at which the interface portion engages the 3D body.

In yet another implementation, altering the halftone range includes reducing a number of gray levels. This can include reducing the number of gray levels by at least 20%, at least 30%, at least 40%, at least 50%, at least 60%, at least 70%, at least 80%, or at least 90%.

In a further implementation, the system includes a print engine. The controller is further configured to operate the print engine to fabricate the three-dimensional article in a layer-by-layer manner.

In a second aspect of the disclosure, a method for manufacturing a three-dimensional article includes: receiving an input file defining a geometry of the three-dimensional article; receiving information specifying an interface surface of the article over which the article will fit against a three-dimensional body; slicing the geometry; identifying intersecting slices that intersect the interface surface; and for the intersecting slices, altering a halftone range along the interface surface.

In a third aspect of the disclosure, a computer-readable storage medium is for manufacturing a three-dimensional article. The computer-readable storage medium is non-transitory and has computer-readable code portions stored therein. In response to execution by a processor, the computer-readable code portions cause an apparatus to at least: receive an input file defining a geometry of the three-dimensional article; receive information specifying an interface surface of the article over which the article will fit against a three-dimensional body; slice the geometry; identify intersecting slices that intersect the interface surface; and for the intersecting slices, alter a halftone range along the interface surface.

DETAILED DESCRIPTION OF THE PREFERRED EMBODIMENTS

Figure 1:
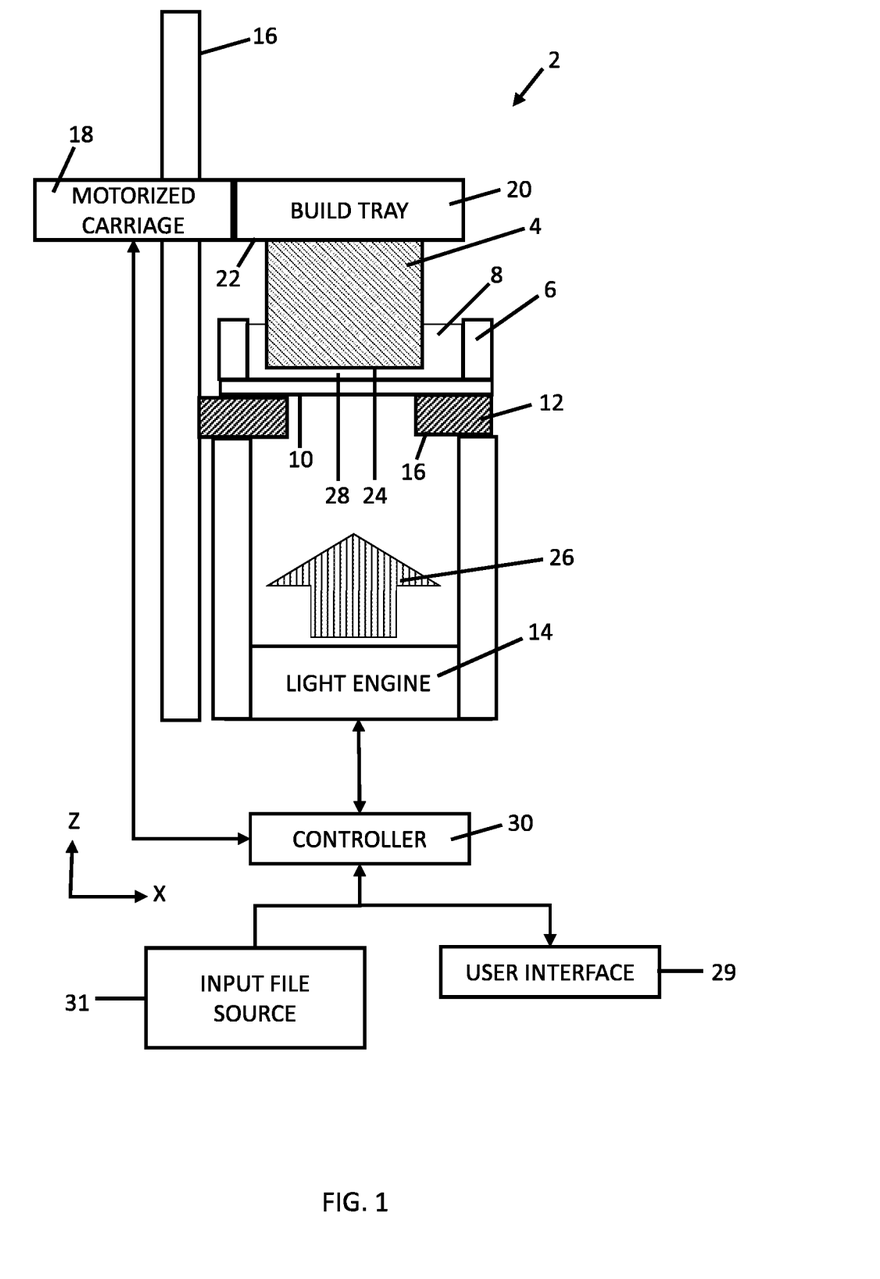
FIG. 1 is a schematic view of an embodiment of a three-dimensional print engine for fabricating a three-dimensional article.

FIG. 1 is a schematic view of an embodiment of a three-dimensional print engine 2 for fabricating a three-dimensional article 4. In describing the following figures, mutually perpendicular axes X, Y, and Z will be used. Axes X and Y are lateral axes that are generally horizontal. Axis Z is a vertical axis that is generally aligned with a gravitational reference. The direction +Z is generally upward and the direction −Z is generally downward. Use of the word "generally" refers to being true by design to within normal mechanical manufacturing tolerances.

Print engine 2 includes a resin vessel 6 containing a photocurable resin 8. A transparent sheet 10 provides a lower bound for the resin 8. The resin vessel 6 is supported by a support plate 12, which is mechanically coupled to a light engine 14. The support plate 12 is in turn coupled to a main vertical support 16.

A motorized carriage 18 is coupled to the main vertical support 16. The motorized carriage 18 supports and positions a build tray 20. The three-dimensional article 4 is supported by and attached to a lower surface 22 of build tray 20. The three-dimensional article 4 has a lower face 24 that is in facing relation with the transparent sheet 10.

The light engine 14 selectively projects pixelated light 26 up through the transparent sheet and defines a build plane 28. The build plane 28 is proximate to the lower face 24 and defines a lateral extent that the light engine 14 can image and harden resin 8 above the transparent sheet 10. In an illustrated embodiment, the light engine 14 includes a light source and a spatial light modulator. In other embodiments, the light engine 14 can include one or more lasers or other sources of radiation for defining the build plane 28 and selectively curing layers of the resin 8 onto the lower face 24.

A controller 30 is controllably coupled to portions of the print engine 2 including the motorized carriage 18 and the light engine 14. The controller 30 includes a processor coupled to an information storage device. The information storage device includes a non-volatile or non-transient storage device storing software instructions. When executed by the processor, the software instructions control portions of the print engine 2 including the motorized carriage 18 and the light engine 14. The software instructions also process incoming input files 31 before they can be utilized by the print engine 2. Element 31 is used to indicate an input file 31 and/or the source of an input file 31 since the source 31 has the non-transient or non-volatile hardware that defines the input file 31.

Controller 30 can be one integrated discrete computer or it can include a plurality of locally and remotely coupled computing devices. The software can operate locally on one device or across various locally and remotely coupled devices. The computing devices can include client devices and/or servers.

Controller 30 can be coupled to a user interface 29 which can be used to control the print engine 2. The user interface 29 can be part of a client device such as a host computer, a mobile computer, a laptop, a tablet computer, or a smart phone.

The execution of the software instructions can cause the following steps to be executed: (1) a file 31 representing the article 4 is received by controller 30; (2) the file 31 is processed to optimize a geometry and a print process; (3) the motorized carrier is operated to position a lower face 24 (initially of the build tray 20 and later the three-dimensional article 4) proximate to build plane 28; (4) the light engine is operated to selectively image and harden the resin 8 at the build plane 28 to accrete a layer of selectively hardened resin 8 onto the lower face 24; steps (3) and (4) are repeated until the article 4 is fabricated.

In an alternative embodiment of print engine 2, an upper surface of a build tray or platen can support the three-dimensional article 4 within a resin vessel. The light engine can project radiation downwardly to a build plane defined proximate to a top surface of the three-dimensional article. Methods of the present disclosure can apply various forms of the print engine 2 including the aforementioned examples.

Figure 2:
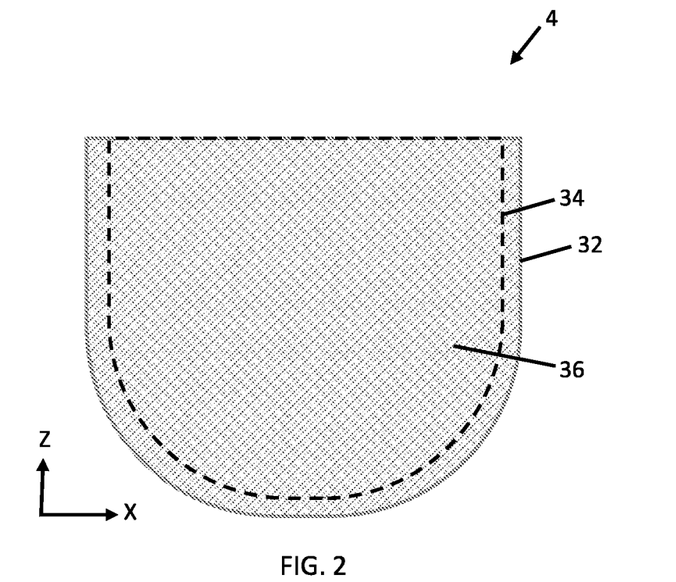
FIG. 2 is a side view illustration of a hollow three-dimensional article.

FIG. 2 depicts a side view of an embodiment of a hollow three-dimensional article 4. The three-dimensional article 4 has an outer surface 32 and an opposing inner surface 34. In the illustrated embodiment, surface 34 is a concave surface 34 and defines an internal cavity 36.

Figure 3:
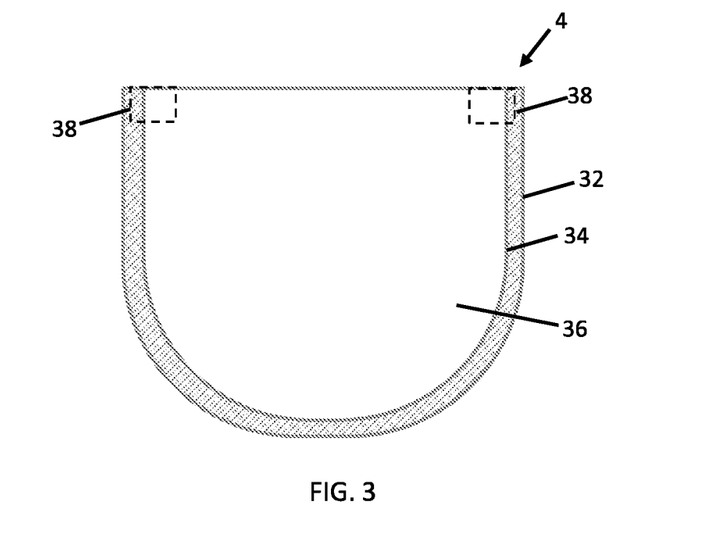
FIG. 3 is a side cross-sectional view of a hollow three-dimensional article.

FIG. 3 depicts a side cross-sectional view of the three-dimensional article 4. In the illustrated embodiment, surface 34 includes an interface surface 38. The interface surface 38 is a precision surface that can interface with another body. The article 4 fits against another body over the interface surface 34. Along the interface surface 38, the article 4 can slidingly engage the body. The sliding engagement can be sufficient to provide a fluid seal along and over the interface surface 38.

An example of such a body is a tooth that is to receive a dental crown. A dental crown has a concave surface defining a cavity for receiving an end of the tooth. A leading portion 38 of the concave surface 34 is referred to as an "outer margin" of the concave surface 34 and can accurately seal to an outside surface of the tooth.

Figure 4:
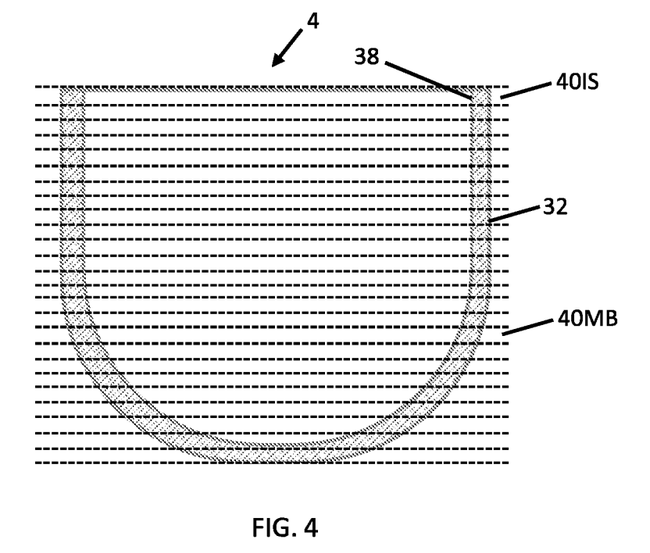
FIG. 4 is a side cross-sectional view illustrating slicing of the article from FIG. 3.

FIG. 4 depicts a body 4 or model 4 of the three-dimensional article 4 after it has been "sliced." The slices shown are not to scale but have a coarser thickness for illustrative purposes. The slices 40 include slices 40 MB that are designated with an MB designator to indicate that they are part of the main body that does not contain any portion of the interface surface 38. The slices 40 also include intersecting slices 40IS with an IS designator to indicate that these contain a part of the interface surface 38. In the illustrated embodiment of FIG. 4, the upper slices 40 are intersecting slices 40IS.

Figure 5:
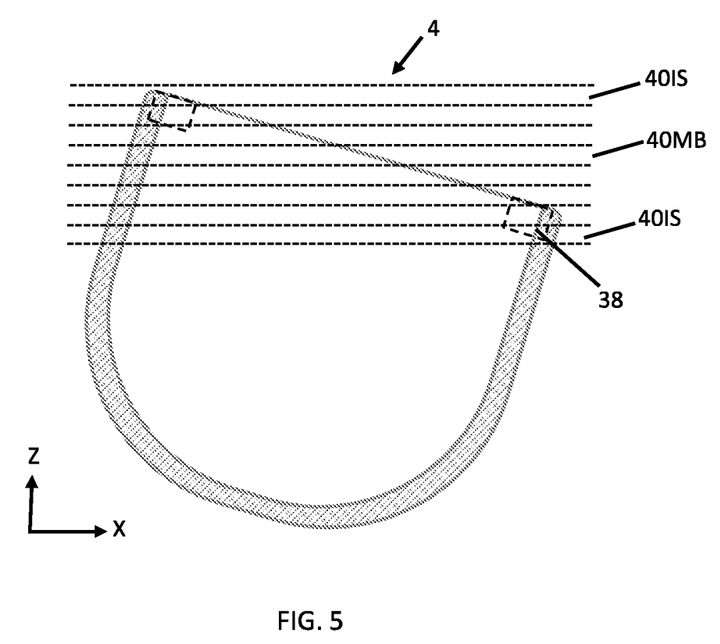
FIG. 5 is a side cross-sectional view illustrating horizontal slicing of an article that is disposed at an oblique angle with respect to a horizontal axis.

FIG. 5 depicts another body 4 in which is rotated such that some of the intersecting slices 40IS intersect with the interface surface 38 but also intersect with portions of the body 40 that have inner surfaces 34 of the main body that are not interface surfaces 38.

Figure 6:
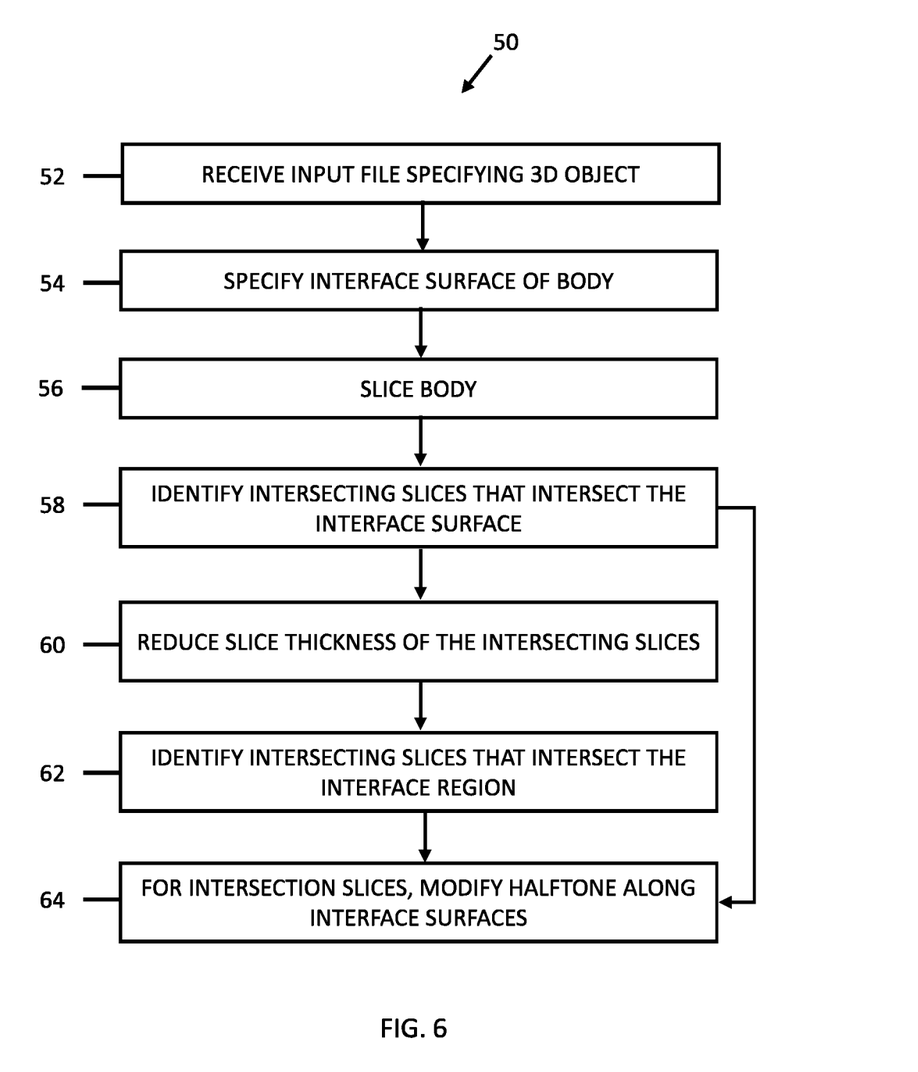
FIG. 6 is a flowchart of an embodiment of a method for processing input data for the three-dimensional print engine.

FIG. 6 is a flowchart depicting an embodiment of a method 50 of processing an input file 31 that defines a three-dimensional object 4 to be manufactured by a print engine 2. The steps of method 50 are performed by controller 30. According to 52, the controller 30 receives an input file 31. Receiving the input file 31 can include a user manually loading an input file 31 into controller 30. Alternatively, controller 30 may receive the input file 31 from a remote server.

According to 54, an interface surface 38 specification is received by controller 30. In one embodiment, controller 30 receives such a specification from a user through a user interface 29. The user interface 29 can be part of a client device such as a host computer, a mobile computer, a laptop, a tablet computer, or a smart phone. In another alternative, the interface surface specification 38 can be received along with the input file 31.

According to 56, the body 4 is sliced to define a sliced three-dimensional body. According to 58, "intersecting slices" 40IS that intersect the interface surface 38 are identified. Steps 56 and 58 are illustrated in FIG. 4 or FIG. 5.

For some embodiments, it may be desirable to enhance a vertical resolution of the intersecting slices 40IS. According to 60, the slice thickness of intersecting slices 40IS is reduced. When this is done, the intersecting slices 40I3 need to be identified again according to 62. An arrow indicates that sometimes the process can proceed from step 58 directly to step 64.

According to 64, halftoning is modified along the interface surfaces 38. In an illustrative embodiment, the default level of halftoning is 8 bit halftoning. With 8 bit halftoning, there are $2^8$ or 256 gray levels that vary from a magnitude of zero to 255 (integer units that a proportional to a cure level).

Figure 7:
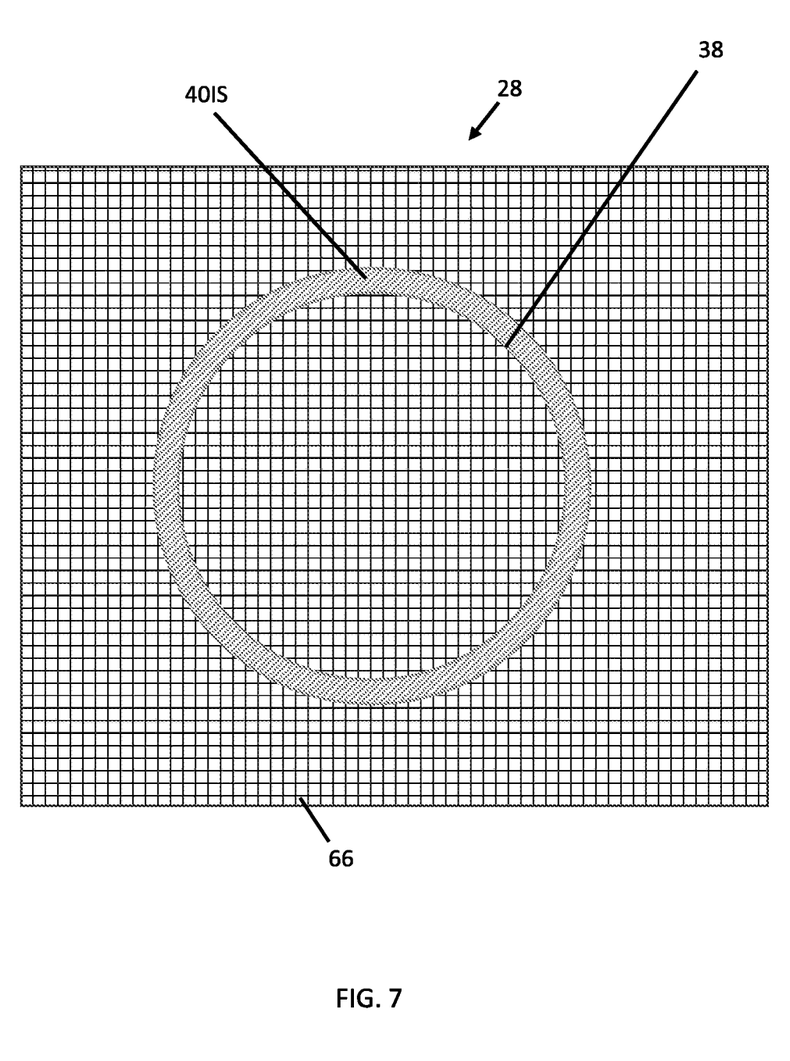
FIG. 7 is a diagram illustrating an embodiment of a build plane superposed on a slice taken from FIG. 4.

A general description of the operation of the print engine 2 was described with respect to FIG. 1. A single slice such as one intersecting slice 40IS is defined by the light engine 14 over the build plane 28. An illustration of a build plane 28 is depicted in FIG. 7 with a single intersecting slice 40IS taken from FIG. 4. The inner diameter of intersecting slice 40IS is a cross section of the interface surface 38.

The build plane 28 is divided up into pixels 66. The light engine 14 is configured to image the pixels individually with a radiation energy that is proportional to the binary number between zero and 255. Pixels 66 that do not overlap the slice 40IS receive zero radiation. Pixels 66 that are completely contained within the slice 40IS receive a radiation energy that is proportional to 255. Pixels that partially overlap slice 40IS receive a radiation proportional to a percentage overlap.

According to method step 64, the pixels that partially overlap the interface surface 38 have their binary numbers (and hence radiation dose) altered. The binary range is decreased so that all pixels below a certain value are set to a fixed value. In an illustrative embodiment, before step 64 pixels can range in value from zero and 255. In step 64 all pixels that are below 200 are set to 200. All other pixels retain their values from 200 to 255. Thus, the average radiation specified is increased for any pixels with a nonzero value below 200.

Figure 8:
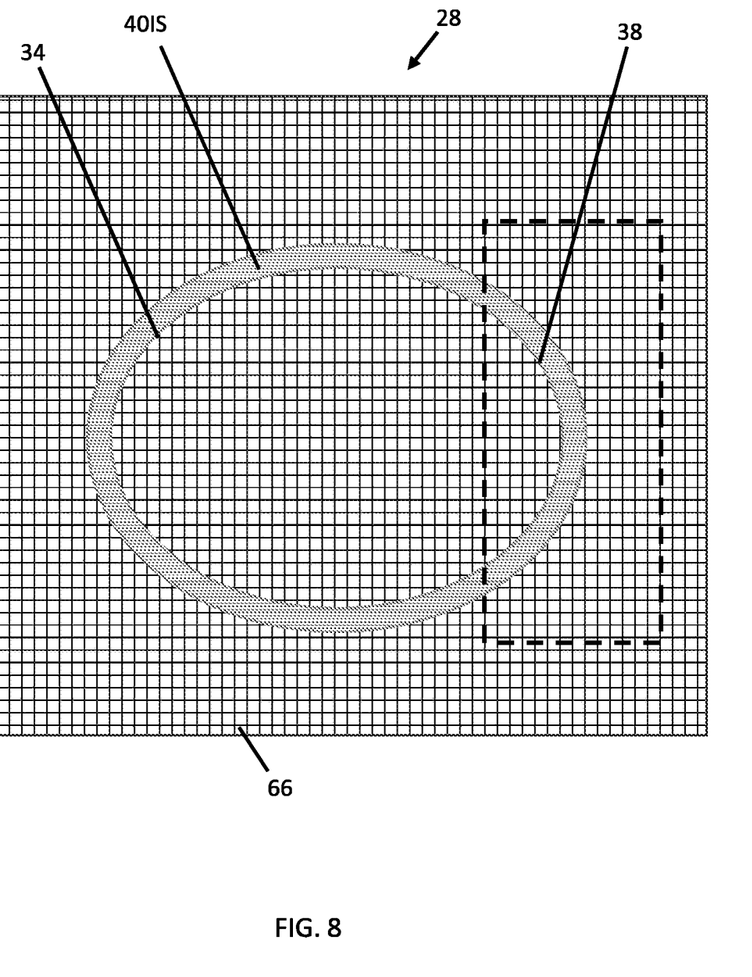
FIG. 8 is a diagram illustrating an embodiment of a build plane superposed on a slice taken from FIG. 5.

For some embodiments such as for FIG. 5 only part of a slice 40IS intersects an interface surface 38. FIG. 8 depicts one such slice taken from FIG. 5. For that slice, the interface surface 38 is limited to the dashed box. For this embodiment, the binary numbers are altered for the interface surface 38 within the dashed box but not necessarily for a remaining inner surface 34 that is not inside the dashed box.

The specific embodiments and applications thereof described above are for illustrative purposes only and do not preclude modifications and variations encompassed by the scope of the following claims.

What is claimed:

1. A method of manufacturing a dental crown comprising:
receiving an input file defining a geometry of the dental crown including a concave surface defining a cavity configured to receive a tooth;
receiving information specifying an interface surface of the dental crown which specifies an outer margin of the concave surface configured to engage and fit over an area of the tooth;
slicing the geometry;
identifying at least one intersecting slice that intersects the interface surface; and
for the at least one intersecting slice, reducing halftone range along the interface surface wherein reducing the halftone range strengthens the outer margin of the dental crown.

2. The method of claim 1 wherein the geometry defines a main surface and the interface surface, the main surface is defined by N gray levels, the interface surface is defined by M gray levels, M<N.

3. The method of claim 1 wherein reducing the halftone range includes reducing a number of gray levels by at least 20%.

4. The method of claim 1 further comprising reducing a slice thickness for the slices that intersect the interface surface.

5. The method of claim 1 further comprising operating a print engine and fabricating the dental crown.

6. A computer-readable storage medium for manufacturing a dental crown by additive manufacturing, the computer-readable storage medium being non-transitory and having computer-readable program code portions stored therein that in response to execution by a processor cause an apparatus to at least:
receive an input file defining a geometry of the dental crown including a concave surface defining a cavity configured to receive a tooth;
receive information specifying an interface surface of the dental crown which specifies an outer margin of the concave surface configured to engage and fit over an area of the tooth;
slice the geometry;
identify at least one intersecting slice that intersects interface surface; and
for the at least one intersecting slice, reducing a halftone range along the interface surface wherein reducing the halftone range strengthens the outer margin of the dental crown.

7. The computer-readable storage medium of claim 6 wherein the geometry defines a main surface and the interface surface, the main surface is defined by N gray levels, the interface surface is defined by M gray levels, M<N.

8. The computer-readable storage medium of claim 6 wherein the altering the halftone range includes reducing a number of gray levels by at least 20%.

9. The computer-readable storage medium of claim 6 wherein the controller is further configured to reduce a slice thickness for the slices that intersect the interface surface.

10. The method of claim 1 wherein reducing the halftone range includes reducing a number of gray levels by at least 40%.

11. The method of claim 1 wherein reducing the halftone range includes reducing a number of gray levels by at least 60%.

12. The method of claim 2 wherein the main surface accounts for at least 90% of a surface area of the dental crown.

13. A method of manufacturing a dental crown comprising:
receiving an input file and information specifying a surface geometry of the dental crown including a main surface and an interface surface, the surface geometry including a concave surface defining a cavity configured to receive a tooth, the interface surface is an outer margin of the concave surface along an entrance to the cavity and is configured to fit against the tooth;
slicing the surface geometry;
identifying a plurality of intersecting slices that intersect the interface surface;
for individual ones of the intersecting slices, reducing a halftone range along the interface surface from N gray levels to M gray levels, M<N, the main surface defined by N gray levels, wherein reducing the halftone range along the interface surface strengthens the outer margin of the dental crown; and operating a print engine to fabricate the dental crown.

14. The method of claim 13 wherein reducing the halftone range includes reducing a number of gray levels by at least 20%.

15. The method of claim 13 wherein reducing the halftone range includes reducing a number of gray levels by at least 30%.

16. The method of claim 13 wherein reducing the halftone range includes reducing a number of gray levels by at least 40%.

17. The method of claim 13 wherein reducing the halftone range includes reducing a number of gray levels by at least 50%.

18. The method of claim 13 wherein reducing the halftone range includes reducing a number of gray levels by at least 60%.

\* \* \* \* \*